Oct. 12, 1948.                    H. L. STRICKLAND                    2,451,256
                                    FILM SPOOL SWITCH
Filed March 12, 1947                                              2 Sheets-Sheet 1

INVENTOR.
H. L. STRICKLAND
BY B. P. Fishburne, Jr.
Agent

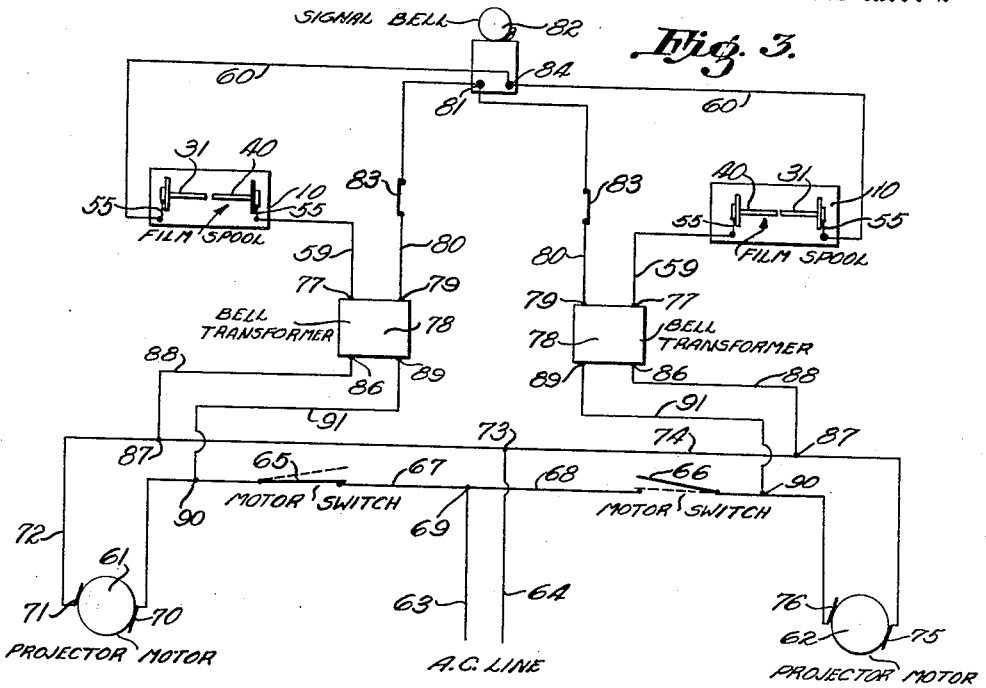

Patented Oct. 12, 1948

2,451,256

UNITED STATES PATENT OFFICE 2,451,256

FILM SPOOL SWITCH

Howard L. Strickland, Clinton, S. C.

Application March 12, 1947, Serial No. 734,076

2 Claims. (Cl. 200—52)

My invention relates to improvements in automatic signaling devices for motion picture projectors.

In the showing of feature length motion pictures it is usual to employ two projectors, each being adapted to show a portion of the film. One projector is first used, and when the portion of the film on its reels has been shown the second projector is brought into use to complete the showing of the motion picture. To assure continuity in the picture during the change over to the second projector, some signaling means is employed to notify the projector operator that the time for the change over has arrived. This signaling has been accomplished in various ways, and it is a primary object of this invention to provide improved means to signal the operator of motion picture projectors, when it is necessary for him to start up the second projector and change over to the same during a lengthy film.

A further important object of the invention is to provide a signaling device for motion picture projectors the operation of which is controlled by the motion picture film, and which has novel means to eliminate the fire hazard due to the inflammability of the film.

A further object is to provide a signaling device to warn the projector operator at desired intervals before the end of one film reel that such end is approaching, and also to instantly alert the operator if the film should happen to break.

A further object is to provide a device of the above mentioned character, which is simple, compact, durable, and relatively inexpensive to manufacture.

Other objects and advantages of the invention will be apparent during the course of the following description.

Figure 1:
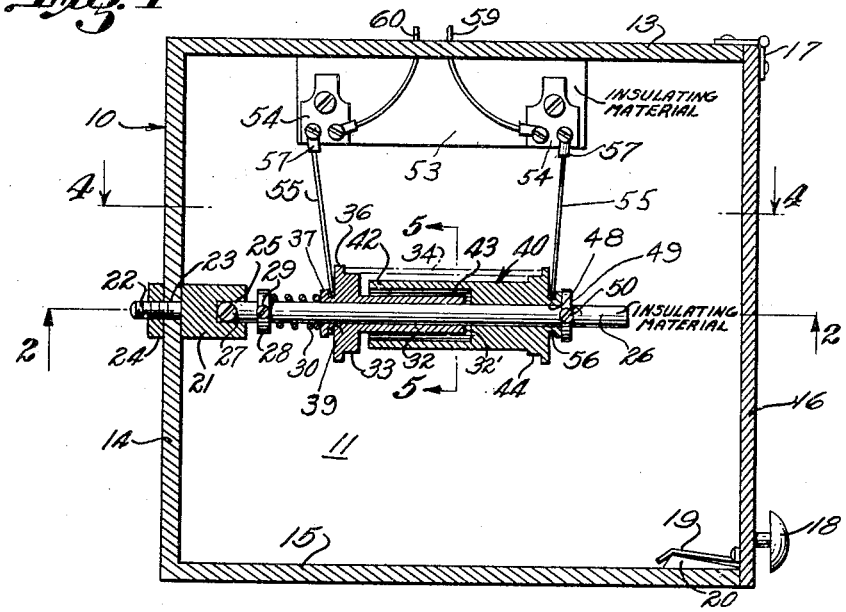
Figure 2:
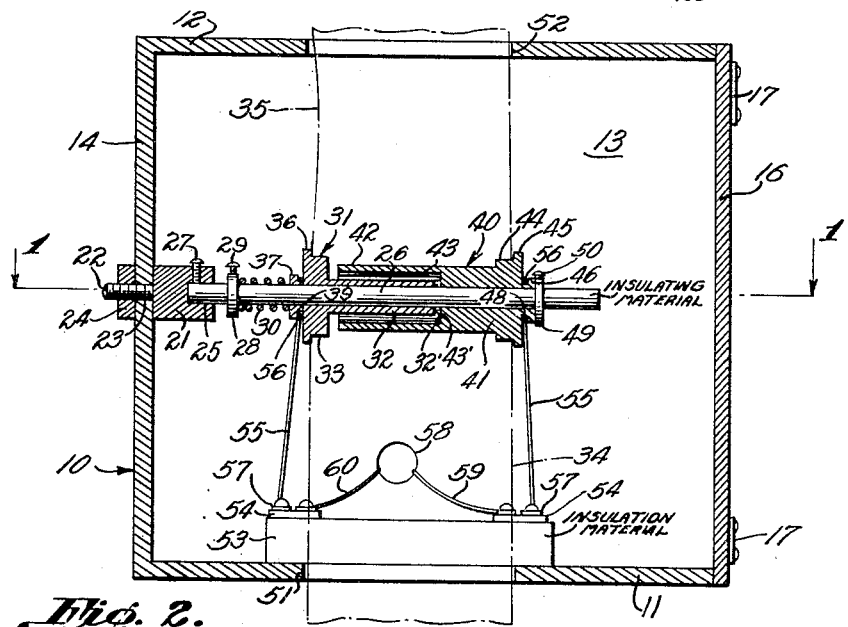

In the accompanying drawings, forming a part of this application, and in which like numerals are employed to designate like parts throughout the same, Figure 1 is a horizontal section through a casing and circuit closing means taken on line 1—1 of Figure 2, Figure 2 is a vertical section taken on line 2—2 of Figure 1, Figure 3 is an electrical wiring schematic of the circuit employed in the use of the signaling device, Figure 4 is a vertical section taken on line 4—4 of Figure 1 showing the film and film spool, Figure 5 is a fragmentary vertical section taken on line 5—5 of Figure 1, and, Figure 6 is a side elevation of a terminal lead and slip ring.

In the drawings, where for the purpose of illustration is shown a preferred embodiment of my invention, the numeral 10 designates a rectangular casing or housing for circuit closing means.

This housing 10 may be formed of metal, such as cast iron or the like, and it comprises a flat rectangular bottom 11, top 12, sides 13, 14, and 15, and a hinged door or cover 16. The casing bottom 11, top 12, and sides 13, 14, and 15, are permanently rigidly secured together, forming a unitary structure. The door 16 is provided with hinges 17, by means of which the door is connected to the side 13 of the housing. The door is provided upon its outer side with a knob or handle 18, and upon its inner side adjacent to the side 15, with a suitable resilient latch element 19. The latch element 19 is adapted to engage over a latch boss or shoulder 20, formed upon the inner surface of the side 15, to maintain the swinging door 16 in the closed position. The door may be pulled open by the knob 18 to provide access to the interior of the casing.

Centrally arranged upon the inner surface of the side 14 is a shaft mounting block 21, having a screw threaded stud 22 formed integral therewith, and extending through an opening 23 in the side 14. A screw threaded nut 24 engages over the stud 23, to rigidly secure the shaft mounting block 21 to the side 14. The block 21 has an axial cylindrical recess 25 in its inner end, and this recess receives one end of a stationary shaft 26. The shaft 26 is rigidly secured within the recess 25 by means of a set screw 27, engaging in a radial screw threaded opening in the shaft mountnig block 21. The shaft 26 is formed of suitable electrical insulating material, and it is rigid.

Mounted upon the shaft 26 near its inner attached end, is an annular adjusting collar 28, provided with a radial set screw 29, by means of which the collar may be securely clamped in the selected adjusted position upon the shaft 26. Also mounted upon the shaft 26 and disposed outwardly from the collar 28 is a suitable coil compression spring 30. The inner end of this spring 30 engages against the annular collar 28, and the outer end of the spring engages against a contact roller 31 which is rotatably mounted upon the shaft 26, and adapted to slide axially thereon under the influence of spring 30. The contact roller 31 is formed of metal having good electrical conductivity, and it includes an elongated cylindrical tubular hub or contact member 32 having an end 32' and receiving the shaft 26. The roller 31 also includes a cylindrical spool or drum portion 33, the outer periphery of which engages a motion picture film 34, as the same passes vertically through the casing 10. The motion picture film 34 is provided with one or more elongated notches 35, which are formed in the longitudinal edge of the film adjacent to the roller 31. The roller 31 also includes an annular flange or shoulder 36 to engage the longitudinal edge of the film 34 having the notch or notches 35. The roller 31 further includes a small axial extension or hub 37, formed integral therewith, and having an annular groove 39 for a purpose to be described. Rotatably mounted upon the shaft 26, outwardly from the roller 31 is a contact or spark shield roller 40. The roller 40 is made of metal having good electrical conductivity, and it includes an annular hub portion 41, having an elongated cylindrical tubular extension or spark shield 42, providing a cylindrical recess 43 to receive the hub 32 therein, and a contact shoulder 43'. A substantial annular space exists between the hub 32 and spark shield 42. Outer end 32' of the hub 32 is adapted to engage and make electrical contact with the contact shoulder 43' when the roller 31 moves axially outwardly upon the shaft 26. The roller 40 also includes an annular drum portion 44, of the same diameter as the drum portion 33, and an annular flange or shoulder 45, identical with the shoulder 36 of the roller 31. The drum portion 44 and flange 45 are engaged by the motion picture film 34 as the film passes vertically through the casing 10. The roller 40 further includes a small annular extension 46, formed integral therewith, provided with an annular groove 48. It is thus seen that the contact rollers 31 and 40 constitute a spool or drum over which the film 34 passes as it moves vertically through the casing 10. Mounted upon the shaft 26, near its outer unsupported end is an annular adjusting collar 49, provided with a set screw 50, for rigidly adjustably clamping the collar upon the shaft 26. Collar 49 is adapted to engage the outer end of the contact roller 40, to prevent outward axial movement of the roller.

The arrangement of the parts which are mounted upon the shaft 26 is such that the contact rollers 31 and 40 are disposed centrally within the casing 10. The bottom 11 and top 12 of the casing are provided with elongated slots 51 and 52 respectively, to permit the vertical passage of motion picture film 34, and these slots are therefore arranged in alignment with the shaft 26.

Rigidly mounted upon the bottom 11 adjacent to the side 13 is a terminal block 53, formed of suitable insulating material. The block 53 carries conducting terminal strips 54, rigidly secured thereto. The numeral 55 designates leads or wires having circularly curved U-shaped conducting or slip rings 56 attached to one of their ends, and standard terminal lugs 57 attached to their opposite ends.

The U-shaped slip rings are adapted to snap over the extensions 37 and 46 of the contact rollers, and to be arranged slidably within the annular grooves 39 and 48 for making electrical contact with the rollers. The terminal lugs 57 are secured to the opposite terminal strips 54, as shown in Figure 2. A small opening 58 is provided in the side 13 as a passage for electric wires 59 and 60, which are electrically connected to opposite terminal strips 54. The wires 59 and 60 pass out of the casing 10 to connect the contact rollers 31 and 40 of the circuit closing means into the electrical circuit of the motion picture projector.

In Figure 3, a wiring schematic is shown, in which two motion picture projectors driven by electric motors 61 and 62 are employed. The numerals 63 and 64 designate the wires of an alternating current supply line to the projector motors. The projector motors 61 and 62 include in their circuits motor switches 65 and 66, electrically connected in wires 67 and 68 respectively. The wire 63 is connected with the wires 67 and 68 at the point 69. The wire 67 is electrically connected with one terminal of the projector motor 61, as at 70. The opposite terminal 71 of the motor 61 is connected with a wire 72, connected with the wire 64 at point 73. Also connected with the wire 64 at point 73 is a wire 74, connected to one terminal of the projector motor 62 as at 75. The opposite terminal 76 of the motor 62 is connected to the wire 68.

In Figure 3, each motion picture projector is equipped with the circuit closing means, including the contact rollers 31 and 40, and their associated circuits. Each contact roller 40 is electrically connected by the wire 59 with one terminal 77 of the low voltage coil of a transformer 78. The opposite terminals 79 of the low voltage coils are connected by means of wires 80 with one terminal 81 of a signal bell 82. Manually operated normally closed switches 83 are interposed in the wires 80, between the bell 82 and transformers 78. The contact rollers 31 are electrically connected with the opposite terminal 84 of the bell 82 by means of wires 60. The terminals 86 of the high voltage coils of transformers 78 are connected with the wires 72 and 74 at the points 87, through wires 88. The opposite terminals 89 of the high voltage coils are connected with the wires 67 and 68 at points 90, through wires 91.

The use and operation of the automatic signaling device is as follows:

Each of the motion picture projectors is equipped with the casing 10, containing the circuit closing means described above. The casing 10 is mounted upon the projector in any suitable manner, and is disposed between the film reels of such projector. The arrangement is such that the film being run off one projector reel and onto the other reel passes vertically through the aligned slots 51 and 52 of the casing 10.

Referring to Figure 3, the projector motor switch 66 is opened, so that its associated projector will not operate. The switch 65 is closed, and the projector driven by the motor 61 will operate. Current flows through wire 63, wire 67, motor switch 65, through the stator winding of the motor 61, wire 72, and back to the wire 64. At this time the film upon the projector reels is passing over the spool consisting of the contact rollers 31 and 40 within the associated casing 10. The parallel longitudinal edges of the moving film engages the annular flanges 36 and 45 of the rollers, and maintain the rollers separated and axially spaced from each other upon the stationary shaft 26, see Figures 1 and 2. The film is under sufficient tension at all times to enable it to counteract the force of spring 30, which tends at all times to push the roller 31 into engagement with the roller 40.

At the desired point or points on the film, and somewhere near the end of the same, the longitudinal elongated notches 35 are provided. The notch or notches 35 are preferably about one-sixteenth of an inch in depth and approximately three inches long. It is desirable to locate one of these notches about one-hundred and fifty feet from the end of the film on the first projector, to provide a preliminary signal so that the operator will at that time light the projector lamp of the opposite machine. A second notch may be provided about sixteen feet from the end of the film to provide a signal for the operator to start the motor of the second projector. A third notch is preferably located about four feet from the end of the film to signal the operator for the actual change over to the opposite projector for the showing of the rest of the movie.

When each of the above described notches 35 passes through the casing 10 and over the associated spool, such notch will become adjacent to the flange 36 of the contact roller 31. When this occurs, the spring 30 will cause the roller 31 to shift axially outwardly upon the shaft 26, and the outer end 32' will make electrical contact with the contact shoulder 43' of the roller 40. When this occurs current flows through the wire 68, terminals 86 and 89 of the high voltage coil of transformer 78, and through the wire 91, back to the wire 67. Simultaneously, current will be induced in the low voltage winding of transformer 78, and it will flow through the wire 59, lead 55, contact rollers 40 and 31, the other lead 55, wire 60, through the terminals 84 and 81 of the signal bell 82, and through the wire 80, back to the transformer terminal 79. The signal bell 82 will ring at that instant, to notify the operator, as stated.

When the end of the film on the reels of the first projector has been reached, and the second projector having the motor 62 is started, the motor switch 66 is closed, and the switch 65 of the first projector is opened. If it becomes necessary to switch back to the first projector again before running the third reel of a long motion picture, the circuit closing means associated with the second projector will operate in the same manner as described in connection with the first projector.

The manually operated switches 83 are provided in case it is desirable not to use the signaling device, in which case these switches may be opened. The switches 83 are closed while the device is in use.

Particular attention is called to the construction of the spool consisting of the contact rollers 31 and 40. These rollers are designed to eliminate entirely the fire hazard caused by sparks, made possible when the rollers 31 and 40 make electrical contact in close proximity to the inflammable film. The shield 42 of the roller 40 completely protects the film from the possibility of contact with such flying sparks.

It is to be understood that the form of my invention herewith shown and described is to be taken as a preferred example of the same, and that various changes in the shape, size, and arrangement of parts may be resorted to, without departing from the spirit of my invention or the scope of the subjoined claims.

Having thus described my invention, what I claim is:

1. An electrical circuit closing switch for use in connection with a film having a notch in its longitudinal edge, said switch comprising a rotatable spool, said spool including electrical conducting axially arranged rollers having flanges at their outer ends, the film being arranged between the flanges, said rollers including inner and outer sleeves disposed axially inwardly of the flanges and telescoping, the sleeves being radially insulated, the free end of the inner sleeve engaging the companion roller at the closed end of the outer sleeve for closing the circuit, a spring to effect a relative axial movement between the rollers when the flange of one roller enters the notch in the film, and elements having permanent electrical contact with the rollers.

2. An electrical circuit closing switch for use in connection with a film having a notch in its longitudinal edge, said switch comprising a shaft formed of insulating material, a rotatable spool mounted upon said shaft, and spool including electrical conducting axially arranged rollers having flanges at their outer ends, the film being arranged between the flanges, said rollers including inner and outer sleeves disposed axially inwardly of the flanges and telescoping, the sleeves being radially insulated, the free end of the inner sleeve engaging the companion roller at the closed end of the outer sleeve for closing the circuit, a spring to effect a relative axial movement between the rollers when the flange of one roller enters the notch in the film, and elements having permanent electrical contact with the rollers.

HOWARD L. STRICKLAND.

REFERENCES CITED

The following references are of record in the file of this patent:

UNITED STATES PATENTS

| Number | Name | Date |
| --- | --- | --- |
| 1,476,006 | Phimister | Dec. 4, 1923 |
| 1,718,387 | Simons | June 25, 1929 |
| 1,821,775 | Tittle | Sept. 1, 1931 |
| 2,016,506 | Maluss et al. | Oct. 8, 1935 |

FOREIGN PATENTS

| Number | Country | Date |
| --- | --- | --- |
| 599,001 | Germany | June 22, 1934 |